United States Patent [19] [11] Patent Number: 5,028,298
Baba et al. [45] Date of Patent: Jul. 2, 1991

[54] WASTE WATER CONCENTRATOR AND WASTE WATER DISPOSAL PLANT

[75] Inventors: Tsutomu Baba, Katsuta; Koichi Chino; Shunsuke Uchida, both of Hitachi; Toshio Sawa; Makoto Kikuchi, both of Hitachi, all of Japan

[73] Assignee: Hitachi, Ltd., Tokyo, Japan

[21] Appl. No.: 273,513

[22] PCT Filed: Mar. 9, 1988

[86] PCT No.: PCT/JP88/00245

§ 371 Date: Nov. 4, 1988

§ 102(e) Date: Nov. 4, 1988

[87] PCT Pub. No.: WO88/06914

PCT Pub. Date: Sep. 22, 1988

[30] Foreign Application Priority Data

Mar. 11, 1987 [JP] Japan ..................... 62-54035

[51] Int. Cl.⁵ .......................... B01D 61/36; C02F 1/04
[52] U.S. Cl. .................................... 159/31; 159/47.3;
159/DIG. 12; 159/DIG. 27; 159/DIG. 28;
55/158; 202/161; 202/197; 202/200; 203/11;
203/40; 203/DIG. 14; 210/640; 252/632
[58] Field of Search ............... 202/197, 200, 182, 161,
202/202, 205, 186; 203/40, 39, 11, 41, 10, DIG.
13, DIG. 14, DIG. 17, 87; 210/640, 257.2, 259;
159/DIG. 27, 47.3, DIG. 16, DIG. 12, 31,
DIG. 28; 55/16, 158, 159; 252/632, 631;
122/489, 492

[56] References Cited

U.S. PATENT DOCUMENTS

| 3,293,151 | 12/1966 | Holzer et al. | 159/DIG. 12 |
| 3,303,105 | 2/1967 | Konikoff et al. | 210/640 |
| 3,455,792 | 7/1969 | Ohta | 159/DIG. 27 |
| 3,463,706 | 8/1969 | Randell | 202/202 |
| 3,540,986 | 11/1970 | Guarino | 159/DIG. 27 |
| 4,308,105 | 12/1981 | Schiffers et al. | 202/197 |
| 4,316,774 | 2/1982 | Trusch | 159/DIG. 27 |
| 4,575,404 | 3/1986 | Goto et al. | 202/202 |
| 4,586,981 | 5/1986 | Golubev et al. | 202/197 |
| 4,613,412 | 6/1986 | MacDermid | 203/DIG. 14 |
| 4,664,752 | 5/1987 | Zievers et al. | 202/197 |
| 4,687,547 | 8/1987 | Jekat et al. | 202/197 |
| 4,754,036 | 3/1986 | Henriot | 202/197 |
| 4,895,989 | 1/1990 | Sander et al. | 203/40 |
| 4,913,771 | 4/1990 | McIntyre | 203/DIG. 14 |

FOREIGN PATENT DOCUMENTS

| 57-81803 | 5/1982 | Japan . |
| 60-248204 | 12/1985 | Japan . |
| 61-286798 | 12/1986 | Japan . |
| 62-144702 | 6/1987 | Japan . |
| 62-180790 | 8/1987 | Japan . |
| 63-4827 | 1/1988 | Japan . |
| 63-267492 | 11/1988 | Japan | 202/200 |

Primary Examiner—Wilbur Bascomb
Attorney, Agent, or Firm—Antonelli, Terry, Stout & Kraus

[57] ABSTRACT

The present invention relates to a technique of concentrating waste water whereby the water content of the waste water is removed with a high decontamination factor, employs a porous membrane having a property allowing gas such as steam to permeate but not allowing a liquid such as water to do, as a membrane for concentrating the waste water, and adopts a method wherein the waste water is turned into a vapor flow and this vapor flow is made to contact the porous membrane so as for the waste water to be concentrated on the occasion when the waste water is to be concentrated by means of this porous membrane. By turning the waste water into the vapor flow, most of various metal ions, a surfactant, etc. existing in the waste water are separated from the vapor flow. Mist, metal ions in the mist and others contained in the vapor flow are removed by the aforesaid porous membrane from the steam while permeating the same. This enables the disposal of the waste water with a high decontamination factor, for a long duration and in a stable manner. When this technique of concentrating waste water is adapted to a plant for disposal of waste water of high electroconductivity produced from a nuclear power station, for instance, various tanks, a demineralizer, ion-exchange resin, etc. provided on the downstream of a concentrator are dispensed with, and thus the plant for disposal can be simplified to a large extent.

8 Claims, 6 Drawing Sheets

WASTE WATER CONCENTRATOR AND WASTE WATER DISPOSAL PLANT

TECHNICAL FIELD

The present invention relates to a waste water concentrator, a waste water disposal plant and a waste water concentrating method, and especially to a waste water concentrator, a waste water disposal plant and a waste water concentrating method which are suitable for removing a water content from waste water with a high decontamination factor.

BACKGROUND ART

A waste water concentrator which is usually used in a nuclear power station, for instance, is constituted by an evaporator 1 and a condenser 4 as shown in FIG. 12. To the evaporator 1, a heater 14 heating waste water by using station-service heating steam 15 is connected via a circulating pump 13. Steam generated through evaporation in the evaporator 1 is sucked by an eductor 5 and brought to a condenser 4 to be turned into condensed water. The waste water is introduced into a concentrator through a valve 7 on the supplying tank side. Concentrated waste water containing solid-state wastes, which is obtained through concentration in the evaporator 1, on the other hand, is introduced into a subsequent process through a take-out valve 8. Although a vapor-liquid separator is provided in the upper part of the evaporator 1, the rate of removal of mist is low and therefore the mist is often transferred onto the condenser side.

In recent years, a method has been contrived wherein concentration itself is conducted by a membrane and thereby a high decontamination factor is obtained. For instance, a method has been proposed, as described in the Official Gazette on Japanese Patent Laid-Open No. 164195/1986, wherein, a hydrophobic polymer porous membrane allowing steam to permeate but not water to do is employed, nuclear power station waste water at a prescribed temperature is made to contact directly this porous membrane on one side thereof, steam is generated from this water and made to permeate onto the other side of said porous membrane, the steam permeating therethrough is cooled down to be condensed, and thus the waste water is concentrated, while deionized water is collected efficiently. This method is not accompanied by the problem of the transfer of mist onto the condensed water side, which occurs when the evaporator and the condenser are employed.

Out of the above-described prior arts, the method using the combination of the evaporator and the condenser has an inferior efficiency in removing metal ions and inorganic substances existing in the mist, and consequently the decontamination factor (hereinafter mentioned as DF) is improved thereby only to about $10^3$. Such an efficiency of removal DF as low as about $10^3$ is too low in terms of the prevention of radioactive contamination in the disposal of waste water containing radioactive substances, in particular, and therefore it requires additional introduction of a demineralizer treating condensed water in the posterior stage of a concentrator.

As for the method of concentration using the porous membrane, it has such a problem as stated below owing to the direct contact of waste water with the porous membrane therein. With regard to the waste water which is the object of waste disposal, waste water of high electroconductivity coming out of a power station (mainly waste water called floor drain) contains a variety of metal ions and soap waste, and in a membrane disposal of a contact type, there is a large possibility of a membrane being clogged therewith. Although DF is raised somewhat in the membrane disposal of the contact type, accordingly, it can reasonably be assumed that the reliability of the machinery and the plant dependent on the life of the membrane lowers. Disclosure of Invention An object of the present invention is to furnish a waste water concentrator and a concentrating method which enable the attainment of high DF and are operable with high reliability for a long time.

A second object of the present invention, in addition to the above object, is to furnish a waste water concentrator and a concentrating method which facilitate the adjustment of a quantity of disposal.

A third object of the present invention, in addition to the above objects, is to simplify a waste water disposal plant.

A fourth object of the present invention, in addition to the above objects, is to simplify a disposal plant of waste water of high electroconductivity in a nuclear power station.

A fifth object of the present invention is to furnish a method of concentrating waste water, such as washing waste water, containing a surfactant, by using a hydrophobic porous membrane which allows steam to permeate but not water to do.

The present invention enables the attainment of high DF and high reliability for a long time by a construction wherein a porous membrane which has a property allowing gas such as steam to permeate but not allowing a liquid such as water to do is employed and, on the occasion of concentration of waste water by means of this porous membrane, the waste water is made, as a vapor flow, to contact the porous membrane to be concentrated. By turning the waste water into the vapor flow, in other words, most of various metal ions, a surfactant, etc. existing in the waste water are separated from the vapor flow (DF is about $10^3$). Mist or metal ions contained in the mist or a very minute quantity of inorganic substance scattered therein, which are contained in the vapor flow, are removed from the steam permeating the porous membrane (DF is about $10^6$) by using the porous membrane having the property allowing a gas to permeate but not allowing a liquid to do, as a mist separator. Accordingly, the employment of the porous membrane in a mode of non-contact with waste water makes it possible to avoid the problem of clogging of the membrane involved in the prior art, enabling the prolongation of the life of the membrane and thus enabling the effective and long stable utilization of a DF function which the porous membrane has.

Moreover, the present invention makes it easy to control a pressure difference between the front and rear sides of the porous membrane and consequently to adjust the quantity of disposal by refluxing the vapor flow not permeating the porous membrane to a part wherein it is generated. In other words, by refluxing the vapor flow not permeating the porous membrane onto the side of the part wherein it is generated, a pressure acting on the membrane on the side of the generation of the vapor flow is kept constant, and therefore a differential pressure across the porous membrane can be adjusted by regulating a pressure on the permeation side of the membrane. The adjustment of the quantity of disposal is further facilitated by providing a means to make variable the pressure difference across the porous membrane. Concretely, the pressure difference across the porous membrane may be adjusted, for instance, by an eductor provided on the permeation side of the porous membrane. The quantity of disposal (efficiency) can be increased easily by reducing the pressure on the permeation side of the membrane by the suction by means of the eductor.

Furthermore, the present invention simplifies the waste water disposal plant to a large extent by using the above-mentioned waste water concentrator for constructing the waste water disposal plant and by providing this plant with a tank accommodating the steam permeating the porous membrane of the concentrator as condensed water and a tank accommodating a concentrated liquid. When the waste water disposal plant is constructed with the above-mentioned waste water concentrator used as the central device, in other words, the steam permeating the concentrator can be obtained with high DF, and therefore the steam permeating the membrane can be reused as condensed water without providing any special device such as a demineralizer in the rear stage of the concentrator. Besides, the steam can also be introduced as condensed water into a tank provided for outside the system releasing. Because of these effects, the disposal plant can be simplified to a large extent.

In addition, the present invention is aimed at simplifying the waste water disposal plant of a nuclear power station by adapting the aforesaid waste water concentrator to the concentration of waste water of high electroconductivity of the nuclear power station and by introducing the steam permeating the porous membrane as condensed water into a condensate storage tank without interposing the demineralizer. When the aforesaid waste water concentrator is used for the plant for disposal of high-conductivity waste water of the nuclear power station, the condensed water of the steam permeating the concentrator can be obtained with high DF, and therefore the demineralizer provided conventionally in the rear stage of the concentrator can be dispensed with. Moreover, since DF can be raised to so high a degree as to enable the reuse of the substance which can not be reused and so is stored separately according to prior art, the waste water disposal plant can be simplified to a large extent by introducing the same into a condensate storage tank wherein waste water of low conductivity subjected to disposal is stored.

Besides, the present invention enables the disposal of waste water containing a surfactant by the use of the hydrophobic porous rembrane, by a construction wherein the waste water is subjected to evaporation as the first stage in the concentration of the waste water containing the surfactant such as washing waste water, so as to concentrate the component of the surfactant in the waste water, and the waste water wherefrom the component of the surfactant is removed is further concentrated by means of the hydrophobic porous membrane. When the waste water containing the surfactant such as the washing waste water is subjected to the evaporation conducted as the first stage, in other words, the surfactant is left in the waste water since it hardly becomes mist. When the substance wherefrom the component of the surfactant is separated by the evaporation is made to contact the hydrophobic porous membrane, accordingly, steam and water can be separated from each other in a stable manner since the hydrophobicity of the porous membrane is not damaged by the surfactant, and thus the disposal of the waste water containing the surfactant is enabled. Although the waste water wherefrom the surfactant is separated might be made to contact, in the state of liquid, the hydrophobic porous membrane as well for disposal, in this case, the method wherein the waste water is put in the state of liquid and then concentrated by the hydrophobic porous membrane is not very preferable in terms of thermal efficiency and others, and therefore it is preferable that the waste water is introduced as the vapor flow into the hydrophobic porous membrane so as to be concentrated thereby.

BEST MODE FOR CARRYING OUT THE INVENTION

Figure 1:
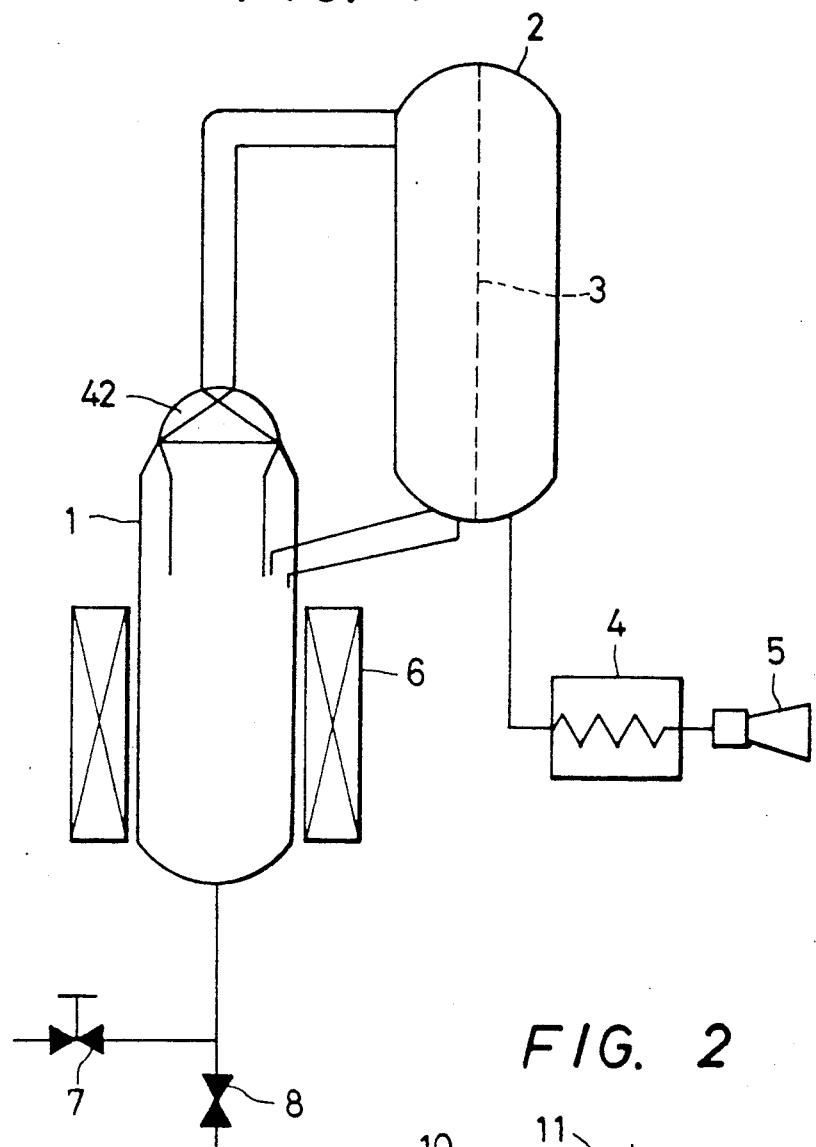
FIG. 1 is a sectional view of a waste water concentrator which is one embodiment of the present invention.

Embodiments of the present invention will be described in detail hereunder with drawings used.

A first embodiment will be described, with FIG. 1 referred to, in regard to a case when waste water of high electroconductivity (whose main constituent is floor drain) coming out of a nuclear power station is disposed of. First, a description will be made on the summary of a plant. Basically, the plant consists of two elements. One of them is an evaporator 1 wherein steam is generated by heating waste water by a heater 6, and the other is a membrane demister 2 as a mist separator which has a functional membrane 3.

In the upper part of the evaporator 1, a vapor-liquid separator 42 is provided for preventing bumping and the like. A device, such as a wire mesh packed layer, which is known publicly is employed as this vapor-liquid separator. A condenser 4 and an eductor 5 for generating a pressure difference are provided as devices appurtenant to said evaporator 1 and membrane demister 2, and also a valve 7 on the supplying tank side and a take-out valve 8 for taking out concentrated waste water are provided as the same devices in the waste water introducing section. Waste water of high electroconductivity is introduced into the evaporator 1 from a tank through the supplying side valve 7. The evaporator 1 is provided with the heater 6, and the temperature of the waste water can be raised thereby quickly to a temperature whereat steam is generated. A temperature of 100° C. to 130° C. is sufficient for an ordinary water solution. However, this temperature is set under normal pressures, and when the pressure in the evaporator is regulated, a heater temperature is set at an evaporation temperature under this pressure. Steam thus generated is introduced directly into the membrane demister 2 from the upper part of the evaporator via the vapor-liquid separator 42. In this case, consideration must be given so that a vapor flow may not be condensed before it is introduced into the membrane demister. An appropriate heat insulating means is provided in the section of introduction up to the membrane, if neccessary.

When the vapor flow is introduced into the membrane demister 2, most of various metal ions and constituent materials of soap waste, which exist in waste water to be disposed of and cause the clogging of the membrane, are left in the waste water and separated from the vapor flow. In the membrane demister 2, a hydrophobic porous membrane (called a functional membrane generally) which has a property allowing steam to permeate but not allowing water, mist, salt, ions, etc. to do is provided, and thereby only the pure vapor of water is made to permeate. Mist, water droplets, a minute quantity of salt, ions, etc. filtered by the membrane 3 are collected again to the evaporator 1 in the present system, and only the water content in the waste solution is separated in the form of an approximately pure substance, while concentrated waste water is left in the evaporator, by a series of operations. This concentrated waste water is introduced into a process for disposal of solid-state waste through the take-out valve 8. 30. Meanwhile, the steam separated by the membrane 3 is restored to water droplets by the membrane 3 to be collected, reused or abandoned. For increasing the efficiency of the membrane 3, it is preferable to reduce a pressure on the side of permeation of steam, i.e. on the condenser side, and suction is made on the condenser side by the eductor 5 for this purpose.

An experiment wherein 3.5% NaCl water having by far the higher salt concentration than is supposed ordinally was used in the evaporator 1 showed that the salt concentration of condensed water obtained by the condenser 4 was less than 1 ppm. In this experiment, the salt concentration of the condensed water remained less than 1 ppm and practically no change was perceived even when so high a concentration was reached in the evaporator that NaCl was deposited on the wall surface of the evaporator 1 (the concentration of about 10% NaCl). If the rate of removal of a radioactive nuclide is estimated from this result, DF of $10^6 \sim 10^7$ can be expected. DF of $10^6$ is lower than the limit of detection of radio-activity. Thus, it was confirmed by the experiment that the reuse or outside the system releasing was practicable.

Since the present embodiment has a construction wherein the vapor flow from the evaporator 1 is refluxed thereto, the pressure on the evaporation side is kept at a certain level, and therefore a pressure difference across the membrane can be fixed by adjusting the pressure on the condenser side.

Figure 2:
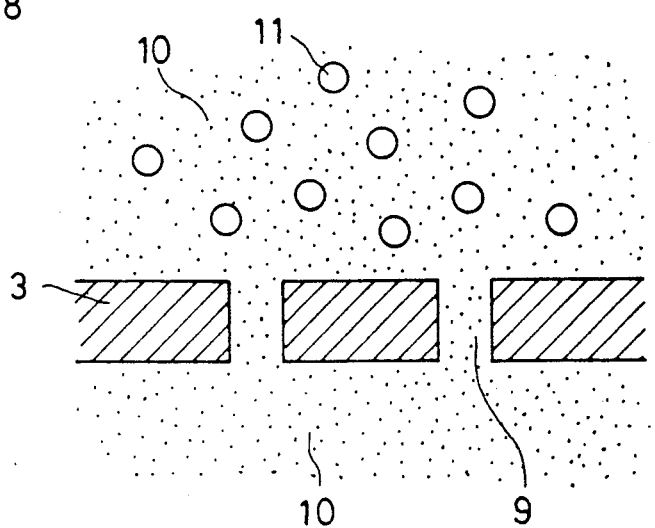
FIG. 2 is a sectional view of a membrane showing the principle of permeation in a membrane demister employed in the present invention.
Figure 3:
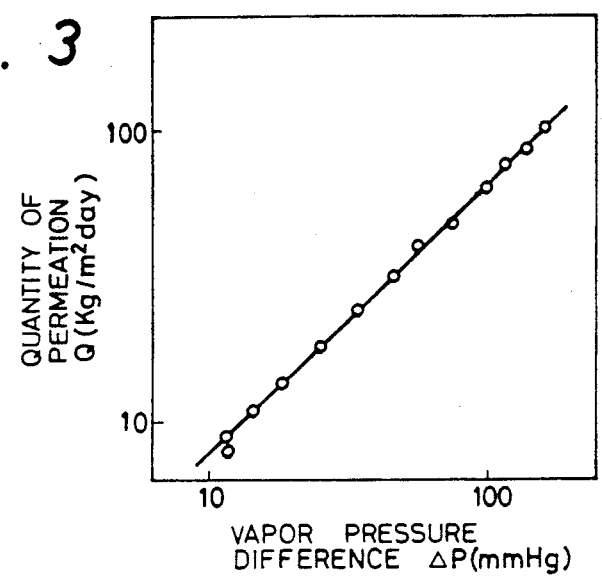
FIG. 3 is a graph showing the relationship between a steam pressure difference and a quantity of permeation with respect to a membrane of the present invention.

Next, a description will be made on a functional film of the present invention and the performance thereof by using FIGS. 2 and 3. FIG. 2 shows a section of the functional film, i.e. a hydrophobic porous membrane, which is employed. As for the material of the hydrophobic porous membrane, polytetrafluoroethylene, polyethylene, polypropylene, polysulfone or the like is suitable, and any other material can be used satisfactorily for the present invention even if it has not especially high hydrophobicity, on condition that it is a porous membrane allowing steam to permeate. In FIG. 2, the membrane 3 has an opening as denoted by numeral 9. When a mixture of steam 10 and mist and water droplets 11 comes onto the surface of the membrane from one side, the steam 10 alone permeates onto the other side selectively through the opening 9. The separation is made due to a difference in particle size between the steam (gas) and the mist and the water droplets (inclusive of a liquid and a solid). In the case when this porous membrane is hydrophobic, the leak of water or mist due to permeation can be prevented completely since the phenomenon of the surface of the membrane getting wet does not occur, and therefore a larger effect of separation can be attained. FIG. 3 shows the result of an experiment wherein polytetrafluoroethylene is used as the material of the membrane. This makes it apparent that an increase in a vapor pressure difference is accompanied by a virtually linear increase in the quantity of permeation of steam, though the steam permeates well even when the vapor pressure difference is small. It is found therfrom that the present invention can be utilized more effectively by adopting a method of causing a large vapor pressure difference across the functional membrane, e.g. the reduction of the pressure on the condensed water side, from a viewpoint of increasing the quantity of disposal or making the plant compact.

Next, a description will be made on another embodiment of the present invention.

Figure 4:
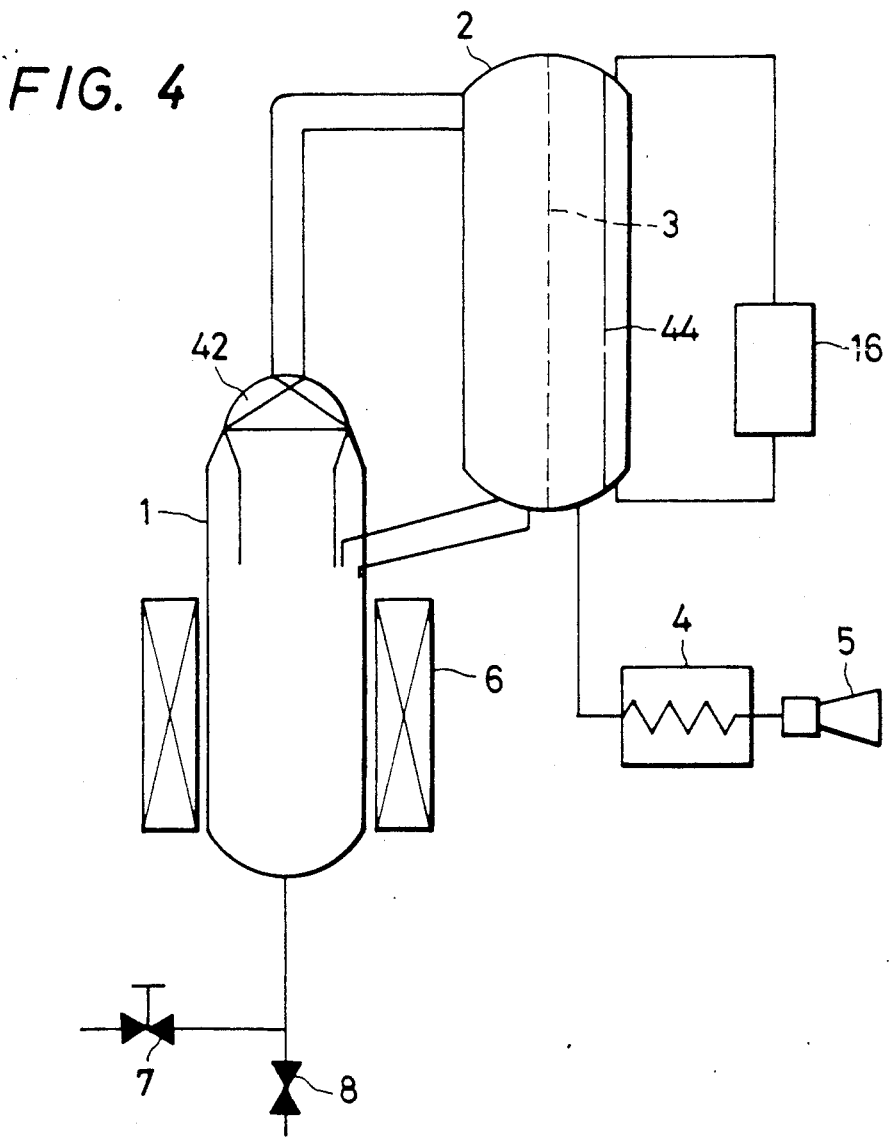
FIGS. 4 to 9 are sectional views of waste water concentrators which are other embodiments of the present invention.

A concentrator shown in FIG. 4 has a construction wherein a cooling plate 44 condensing steam forcibly is introduced into the membrane demister 2 in addition to the device shown in FIG. 1 and a cooling device 16 for this cooling plate 44 is provided. This arrangement is useful for increasing the quantity of permeation through the membrane demister The steam permeating the membrane is condensed forcibly on the surface of the cooling plate 44 provided in the membrane demister. The cooling plate 44 is cooled down to and kept at a fixed temperature by the circulating cooling water supplied from the cooling device 16. The steam which fails to be condensed by the cooling palte 44 is condensed completely by the condenser 4 provided with the eductor 5. By the introduction of the cooling plate 44 for forcible condensation, a larger differential pressure than obtained by the suction of the eductor 5 alone is produced across the membrane, and thereby the quantity of permeation through the membrane demister 2 is increased, whereby a capability of disposal of waste water of the concentrator can be increased.

Figure 5:
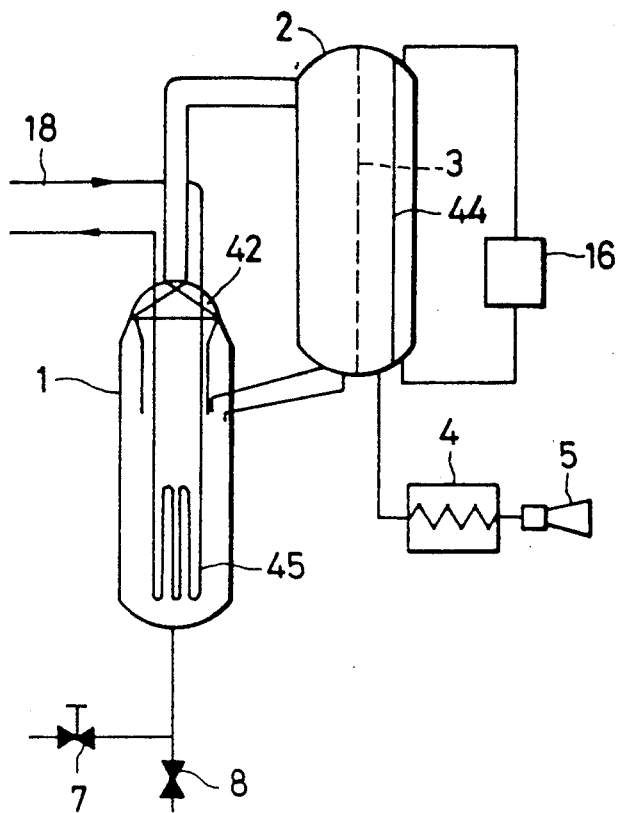
Figure 12:
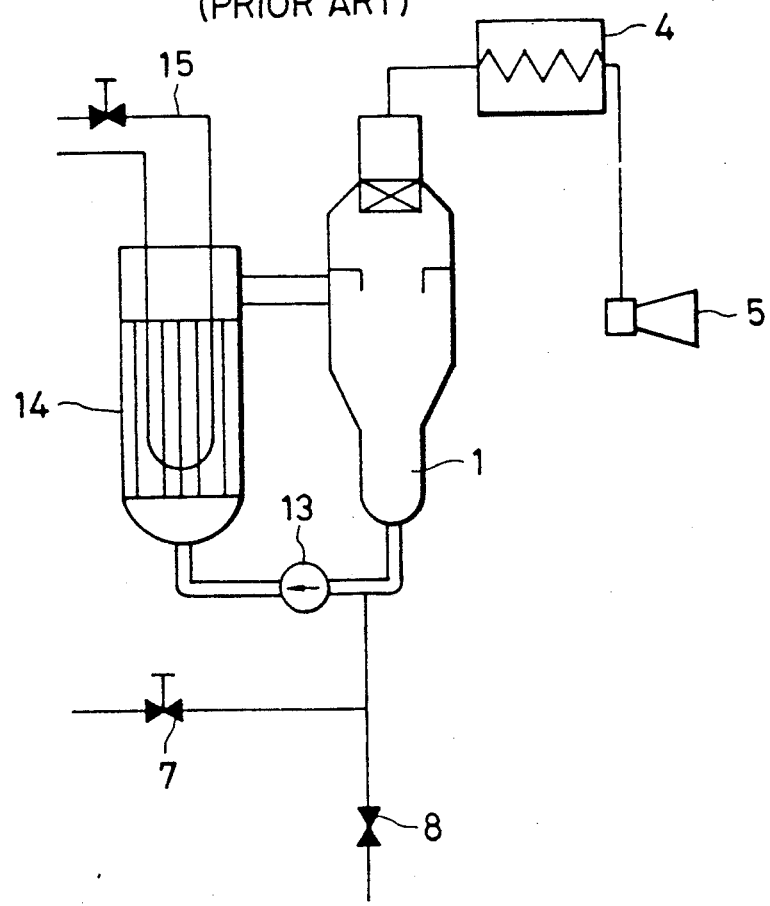
FIG. 12 is a sectional view of a prior-art waste water concentrator.

FIG. 5 shows still another embodiment of the present invention. In the embodiment shown in FIG. 5, heating vapor 18 is used as a heat source instead of a heater, and in addition, the permeating steam side in the membrane demister 2 is cooled down forcibly by the cooling plate 44. An operation of disposal of waste water is the same basically as the ones shown in FIGS. 1 and 4. The station-service steam 18 is made to flow through the inside of the structure of a heat exchanger type heater 45 having a large heating surface so that waste water can be heated efficiently in the evaporator 1. In the case when the corrosion of the heat exchanger type heater 45 by concentrated salt presents a problem, a structure wherein a heating element and the evaporator are separated, such as the conventional one (shown in FIG. 12), is employed. The steam permeating the membrane is condensed forcibly on the surface of the cooling plate 44 provided inside the membrane demister 2, in the same way as in the embodiment shown in FIG. 4. The heating steam 18 used in the present embodiment may be facility-service steam, or a boiler therefor may be installed additionally. In the case of the nuclear power plant, it is advisable to use the plant-service steam as the heating source.

Figure 6:
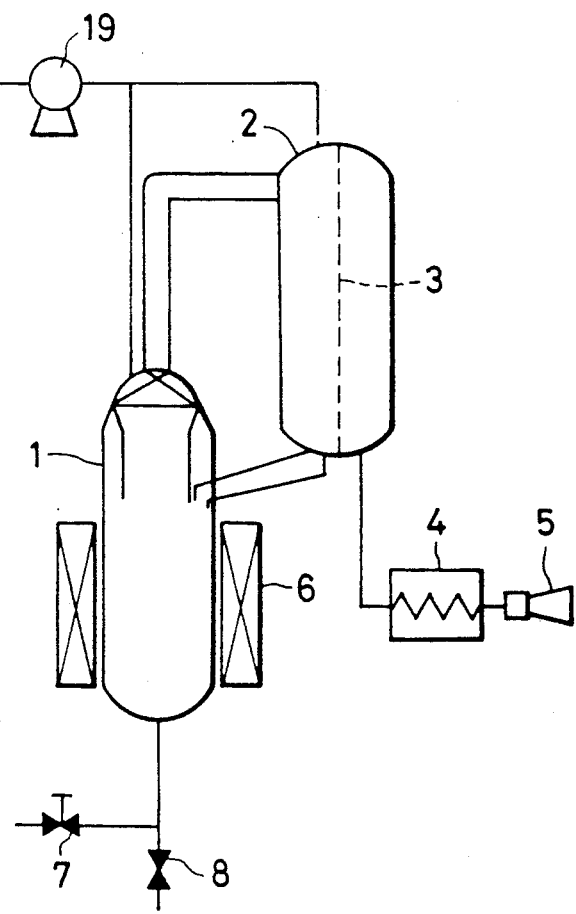

FIG. 6 shows yet another embodiment of the present invention. The present embodiment is designed to concentrate waste water by reduction of pressure, and the pressures in the evaporator 1 and the membrane demister 2 are set lower than normal pressures by a pressure reducing pump 19. This setting facilitates evaporation at a low temperature. The present embodiment has the effects that the heat capacity of a heater can be lessened and that the speed of disposal can be increased. The pressure in the evaporator 1 is made lower than normal pressures by the pressure reducing pump 19, and therefore steam is generated at a lower than normal temperature. The steam thus generated is introduced directly into the membrane demister 2 wherein the pressure is reduced likewise. The operation of disposal of waste water thereafter is conducted in the same way as in the foregoing embodiments. Since the pressure in the evaporator and that on the mixed vapor side of the membrane demister are set to be lower than normal pressures in the present embodiment, the pressure on the permeation side of the membrane is set to be lower than that in the foregoing embodiments by the eductor 5.

Figure 7:
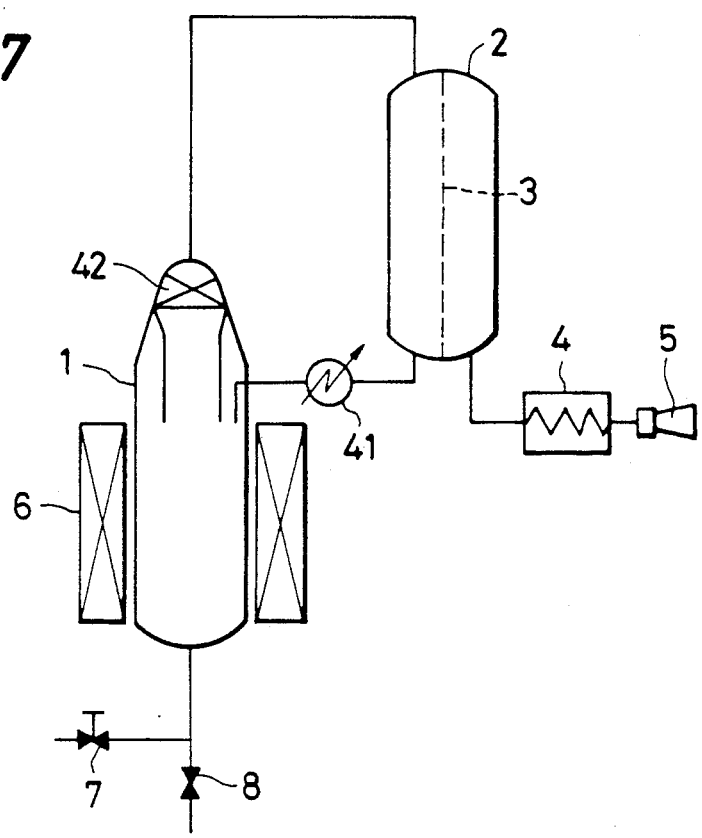

FIG. 7 shows still another embodiment of the present invention. The present embodiment is characterized in that a vapor flow not permeating a membrane module (membrane demister) is condensed by means of a condenser 41 and then returned as circulating water to the evaporator. The operation of disposal of waste water is the same fundamentally as that in the previous embodiments. Mist, salt and inorganic substances incapable of passing through the membrane are refluxed to the evaporator 1 to be concentrated, and on this occasion, the mist separated by the membrane is condensed forcibly by the condenser 41 and then refluxed to the evaporator 1. Thereby a vapor flow introduced continuously into the membrane demister 2 is accelerated. Besides, by the return to the evaporator 1 after condensation, the pressure on the vapor generation side of the membrane can be maintained more constant than when the forcible condensation is not conducted.

Figure 8:
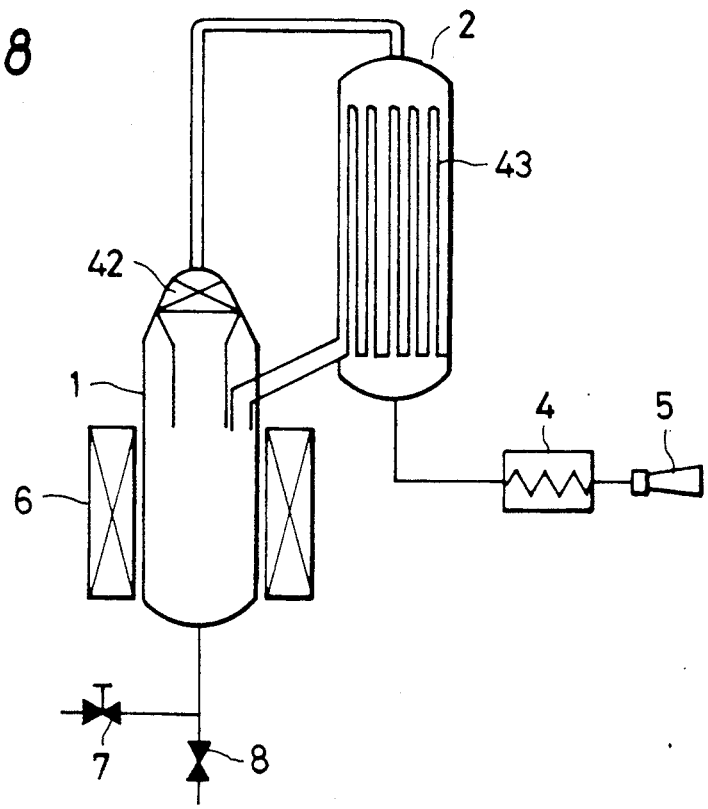

FIG. 8 shows yet another embodiment of the present invention. In the present embodiment, a hollow-fiber-membrane module is employed as the porous membrane. The employment of the hollow-yarn porous membrane produces the effects that an area of permeation can be made wide and that the whole of the membrane module can be made compact. The operation of disposal of waste water is conducted in the same way as in the previous embodiments.

Figure 9:
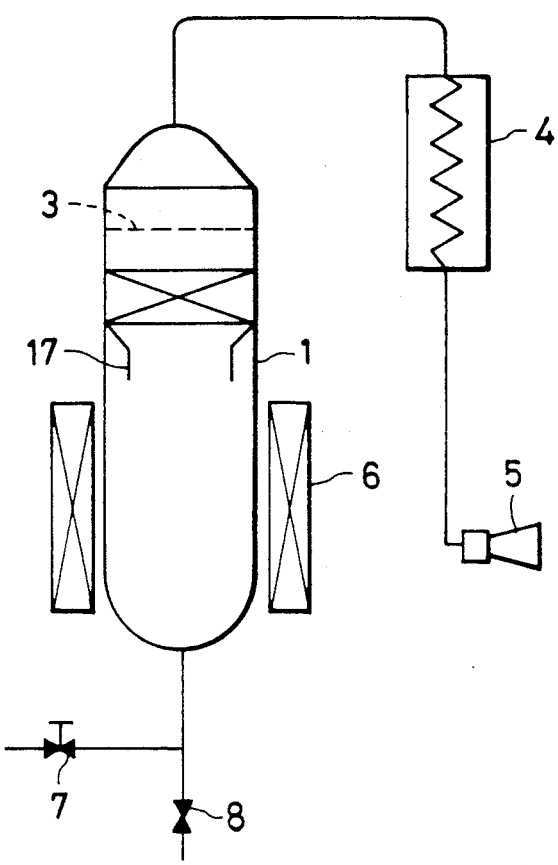

FIG. 9 shows still another embodiment of the present invention. The present embodiment is constructed by introducing a functional membrane into the evaporator. When the membrane demister is provided as a module being separate from the evaporator, the plant must be built so that steam may not be condensed before it is introduced into the membrane demister, and this is disadvantageous when heat energy is not available easily. Therefore, the neck of the evaporator 1 is made long and the membrane, which is a mist separator, is incorporated in the evaporator 1 in the present embodiment. Waste water is introduced into the evaporator 1 through a valve 7 on the supplying tank side. The pressure inside the evaporator 1 is made lower than normal pressures, and a pressure difference of 150 mmHg or above in terms of a vapor pressure difference is established across a functional membrane 3. Being different from the foregoing embodiments, the present embodiment does not have a structure wherein the vapor flow not permeating the membrane is refluxed, and therefore the functional membrane 3 is given a structure to withstand a differential pressure. The vapor generated in the evaporator 1 rises and is subjected to vapor-liquid separation by the membrane 3. Since a kind of membrane distillation under reduced pressure conducted under the reduced pressure inside the evaporator 1 is adopted, a baffle plate 7 is provided in the evaporator 1 so that a liquid running along the wall of the evaporator may not cover the surface of the membrane 3 and result in drop in the efficiency of permeation. The membrane may be installed horizontally, or may also be installed aslant so that mist and others may return easily. The membrane may have either the form of a flat membrane or that of a hollow-fiber membrane. In the present embodiment, a hydrophobic porous hollow-yarn membrane is optimum for increasing an area of the membrane and making the demister element compact. The steam passing through the functional membrane 3 is introduced into the condenser 4 by the suction of the eductor 5 and condensed therein. Meanwhile, mist, salt and inorganic substances not passing through the membrane are concentrated in the evaporator 1. After concentrated to a certain degree of concentration, they are supplied to a subsequent process of disposal through a take-out valve 8 fitted below the evaporator 1. Condensed water is supplied to a process of reuse or released outside the system as it is.

By the use of a membrane having sufficient heat resistance and pressure resistance, it is possible, according to the present embodiment, to dispose of waste water in a quantity about twice as large as the quantity of disposal (speed of disposal) per unit area in the foregoing embodiments, and therefore it is possible further to make the concentrator compact.

Figure 10:
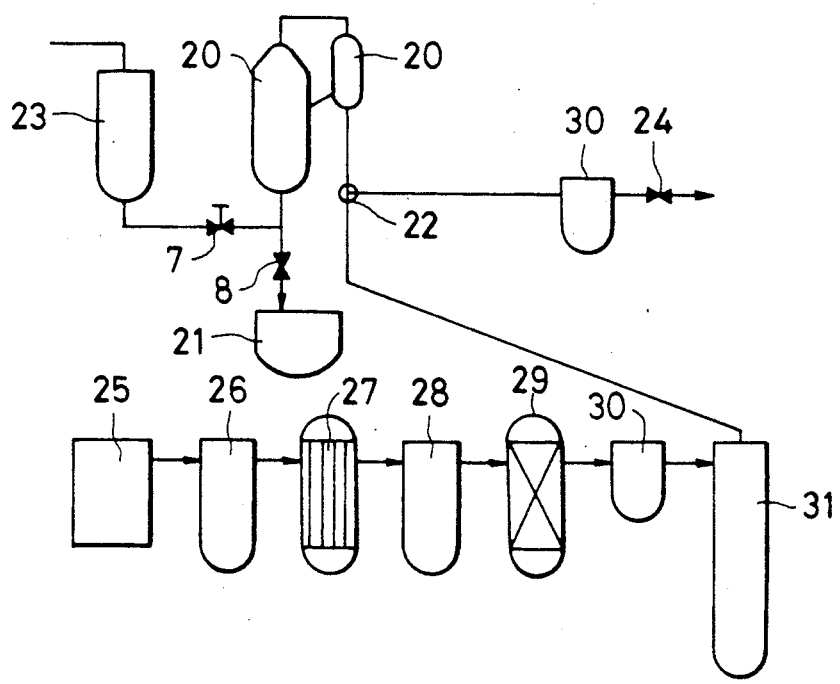
FIG. 10 is a flow sheet showing one embodiment of the present invention when it is used for disposal of waste water coming out of a nuclear power plant.

Next, a description will be made on one embodiment where a system of disposal is built actually by using the present invention. FIG. 10 illustrates a process of disposal of waste water in a nuclear power plant, which is taken as an example. The description will be made based on this process. The waste water of high electroconductivity coming out of the nuclear power plant is collected and stored in a collecting tank 23.

The main source of the waste water of high electroconductivity is floor drain, and soap waste and waste water of experiment are other sources thereof. Sea water is also included therein when it leaks. Waste water of low electroconductivity whose main source is machinery drain, on the other hand, is collected to a collecting bath 25 and then sent from a tank 26 into a sample bath 31 via a filter 27, a tank 28 and a demineralizer 29 using ion-exchange resin.

After the salt concentration thereof and others are measured in the sample bath, this waste water is stored in a condensate storage tank 31 so as to be reused. As for the waste water of high electroconductivity, it is introduced into a concentrator 20 of the present invention from a collecting tank 23 through a valve 7 on the supplying tank side. In the concentrator 20, water is separated to be of high DF. Concentrated waste water containing concentrated residue is taken out of the concentrator 20 and collected to a concentrated waste water storage tank 21 through a valve 8, and afterward it is supplied to a subsequent process of disposal of solid-state wastes. The steam separated in the concentrator 20 is condensed and then sent for reuse into the condensate storage tank which is on a line of disposal of the waste water of low conductivity. A line to the sample bath 30 or to the tank 28 ahead of the demineralizer 29 may also be adopted instead of the direct introduction into the condensate storage tank. In any case, the waste water of high conductivity is not made to pass through a conventional process of disposal used exclusively therefor, but is joined as separated water to the same line of disposal as that of the waste water of low conductivity after it is disposed of by the concentrator 20, for the purpose of reuse of water. When extra water is available in the power plant, it is introduced into the line of disposal of the high-conductivity waste water and subjected to disposal in the concentrator 20, and separated water thus obtained is introduced from a separator 22 into the sample bath 30 employed on the occasion of release of the surplus water to outside the system. After the quantity of radioactivity thereof and others are measured, it is released through a valve 24 for releasing to outside the system. Although not needed ordinarily, this line is effective in the case when a large quantity of leak of sea water occurs or when an increase in waste water occurs beyond expectation after periodic inspection. As is shown by the present embodiment, tanks, the demineralizer, etc. in posterior stages of the concentrator can be dispensed with substantially, in comparison with the prior-art system, by using the concentrator of the present invention for the disposal of the waste water of high conductivity. This makes it possible to make the entire system for disposal of waste water light in weight, to reduce the cost thereof, and also to decrease the parts necessitating maintenance, and therefore the reliability of the entire system for disposal is improved.

Figure 11:
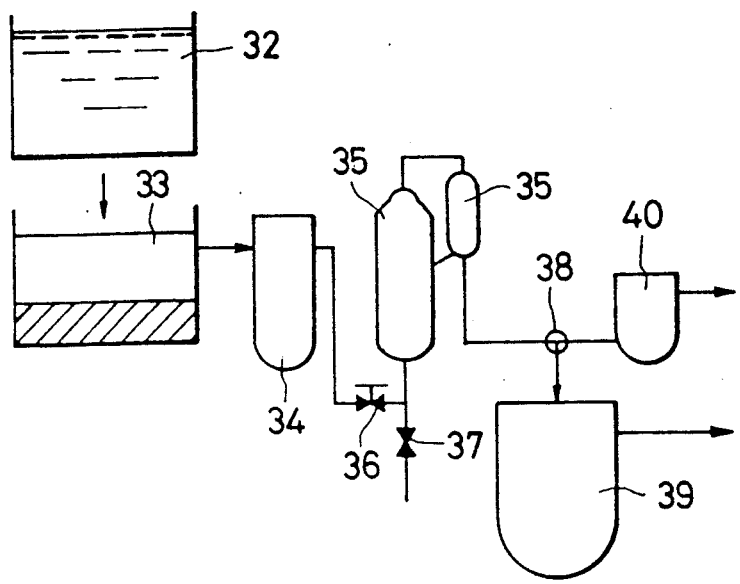
FIG. 11 is a flow sheet showing one embodiment of the present invention when it is used for disposal of general industrail waste water.

Next, a description will be made on an embodiment of the present invention used for the disposal of general industrial waste water, with reference to FIG. 11. As to the general industrial waste water, the system can be simplified, since it is unnecessary to take the problem of radioactive substances into consideration.

Waste water (containing cyanogen or chromium, for instance) is collected to a collecting bath 32 and introduced subsequently into a settling chamber 33, in which the solid-state components thereof are separated by precipitation. A solution located in the upper part of the settling chamber 33 is stored temporarily in a tank 34. Then, it is introduced from tank 34 into a concentrator 35 of the present invention through a valve 36 on the supplying side, and water is separated therein from other components. Since cyanogen or chromium in the separated water is less than 1 ppm, the water is introduced subsequently into an industrial water storage tank 39 to be reused as industrial water. In the case when the separated water is released to outside the system, it is introduced from the concentrator 35 into a sample bath 40 through a separator 38. After measured in the sample bath 40, the water satisfying the criterion of release is released to outside the system. Meanwhile, concentrated waste water containing residue, which is produced in the concentrator, is supplied to a subsequent process for disposal through a take-out valve 37. The above is one example of application of the concentrator of the present invention to general industrial waste water. As to tanks, valves, etc., various combinations of them can be considered. According to the present embodiment, the waste water containing cyanogen, chromium or the like, which is subjected to strict criteria of discharge, can be disposed of in a simple manner and with high rate of removal.

The waste water concentrator of the present invention described above makes it possible to dispose of waste water with high DF (decontamination factor), for long duration and in a stable manner. Moreover, since said concentrator enables the disposal of waste water with high DF, the reuse of separated water is facilitated. When the waste water concentrator of the present invention is adapted to a waste water disposal plant, e.g. a plant for disposal of the waste water of high electroconductivity produced from the nuclear power station, a system for disposal can be simplified to a large extent and the cost thereof can be reduced (by about 30% of the cost of a conventional system for disposal), since various tanks, a demineralizer, ion-exchange resin, etc. required so far on the downstream of the concentrator are dispensed with.

What is claimed is:

1. A waste water concentrator which comprises an evaporator means for generating a flow of vapor and mist of waste water; a mist separator comprising a porous membrane; means for introducing the flow of vapor and mist generated by the evaporator means into said mist separator; said membrane being arranged to contact the flow of vapor and mist introduced into the mist separator and being a membrane which allows gas to permeate therethrough and which prevents a liquid from permeating therethrough; and reflux means connected to said mist separator for returning the mist introduced into said mist separator which does not permeate through the porous membrane from the mist separator as liquid into the evaporator means; said reflux means including means for condensing the mist being returned to said evaporator means to form a liquid and a conduit connected to a side wall of the evaporator means and to said condensing means, said conduit including means for directing the returning liquid downwardly into said evaporator means.

2. A waste water concentrator according to claim 1, wherein the means for introducing the flow of vapor and mist into the mixt separator and the means for refluxing the mist for the mist separator are connected to the mixt separator in an arrangement so that the flow of vapor and mist introduced into the mist separator is caused to pass along the porous membrane in a direction corresponding to the orientation of the porous membrane within the mist separator.

3. A waste water concentrator according to claim 1, wherein said mist separator also comprises a vessel in which the porous membrane is arranged to extend from one side to the other side of the vessel, and means for establishing a variable vapor pressure difference across the porous membrane connected to a vapor outlet of the mist separator.

4. A waste water concentrator according to claim 3, wherein the means for establishing a vapor pressure difference across the porous membrane includes an eductor connected to a conduit leading from the vessel and located at one side of the porous membrane opposite to ht other side of the membrane into which the flow of vapor and mist is introduced.

5. A waste water concentrator according to claim 4, wherein said conduit connected to said eductor and leading from said mist separator includes means for condensing gas taken from the mist separator.

6. A radioactive waste water concentrator comprising means for generating a flow of vapor and mist from radioactive waste water; a mist separator connected to said means for generating a flow of vapor and mist, said mist separator having a membrane for contacting the flow of vapor and mist and said membrane comprising a hydrophobic and porous hololow fiber membrane which allow the vapor to permeate therethrough and which prevents the mist from permeating therethrough; means for condensing the vapor permeated through the membrane connected to said mist separator; and means connected to said mist separator for refluxing and returning the mist not permeated thought membrane as liquid to said means for generating a flow of vapor and mist.

7. A radioactive waste water concentrator according to claim 6, wherein the means for refluxing and returning the mist as liquid to said means for generating a flow of vapor and mist comprises conduit connected to said means for generating a flow of vapor and mist and to said mist separator and means for condensing the mist into liquid.

8. A waste water concentrator which comprises an evaporator means for generating a flow of vapor and mist of waste water; a mist separator comprising a porous membrane; means for introducing the flow of vapor and mist generated by the evaporator means into said mist separator; said membrane being arranged to contact the flow of vapor and mist introduced into the mist separator and mebin a membrane which allows gas to permeate therethrough and which prevents a liquid from permeating therethrough; and reflux means connected to said mist separator for returning the mist introduced into said mist separator which does not permeate thought the porous membrane from the mist separator as liquid into the evaporator means; said reflux means including means for condensing the mist being returned to said evaporator means to form a liquid and a conduit connected to a side wall of the evaporator means and to said condensing means.

* * * * *